United States Patent [19]
Adams

[11] Patent Number: 5,347,072
[45] Date of Patent: Sep. 13, 1994

[54] STABILIZING INORGANIC SUBSTRATES

[76] Inventor: Harold W. Adams, No. 7 Overlook Dr., Monroe, Conn. 06468

[21] Appl. No.: 989,708

[22] Filed: Dec. 14, 1992

Related U.S. Application Data

[63] Continuation-in-part of Ser. No. 738,866, Aug. 1, 1991, abandoned, filed PCT/US92/06068, filed Jul. 22, 1992.

[51] Int. Cl.$^5$ ............................................. B09B 3/00
[52] U.S. Cl. ................................ 588/256; 405/128; 106/287.32
[58] Field of Search ............... 405/128, 129, 258; 588/249, 252, 256; 106/287.32, 503, 900; 71/901

[56] References Cited

U.S. PATENT DOCUMENTS

| | | |
|---|---|---|
| 2,203,881 | 6/1940 | Schwab et al. |
| 4,004,428 | 1/1977 | Tazawa et al. |
| 4,026,719 | 5/1977 | Simic ........................... 106/287.17 |
| 4,155,654 | 5/1979 | Kennepohl et al. ............... 366/16 |
| 4,426,458 | 1/1984 | Woodhams ...................... 501/140 |
| 4,581,442 | 4/1986 | Adams ........................... 521/528 |
| 4,624,837 | 11/1986 | Baker ............................ 423/236 |
| 4,781,944 | 11/1988 | Jones ............................ 427/228 |
| 4,844,815 | 7/1989 | Ader et al. ..................... 210/751 |
| 4,882,067 | 11/1989 | Johnson et al. ................. 210/751 |
| 4,921,936 | 5/1990 | Adams ........................... 528/521 |
| 4,990,404 | 2/1991 | Adams ........................... 428/411.1 |

Primary Examiner—Randolph A. Reese
Assistant Examiner—John Ricci

[57] ABSTRACT

A process for stabilizing a substantially inorganic substrate comprises treating the substrate with sulfur at a temperature above the melting point of sulfur thus converting the substrate into a solid, inert product which resists the leaching of metals, metal ions, and other inorganic ions originally present in the substrate. Organic compounds contained in the substantially inorganic substrate are simultaneously converted to an inert carbon-sulfur polymer.

7 Claims, No Drawings

STABILIZING INORGANIC SUBSTRATES

This application is a continuation-in-part of copending U.S. application Ser. No. 07/738,866, filed Aug. 1, 1991, now abandoned and PCT/US92/06068, filed Jul. 22, 1992.

BACKGROUND OF THE INVENTION

1. Field of the Invention

This invention relates to the field of stabilization of inorganic substrates, the prevention of leaching therefrom, and particularly to the stabilization of metals, metal ions and other inorganic ions in soils which have been contaminated.

2. Description of the Prior Art

Disposal of waste materials or materials inadvertently contaminated with metals, metal ions and other inorganic ions is extremely difficult and costly. There has been a long felt need for a safe and reliable process to stabilize inorganic substrates, especially soils to prevent leaching therefrom and to convert the inorganic substrate to a useful or at least, an innocuous material.

Sanforth in U.S. Pat. No. 4,889,640 describes a method for substantially reducing the leachability of lead and cadmium in foundry waste by treatment of the waste with calcium or magnesium carbonate.

U.S. Pat. No. 4,990,404 discloses that a carbon-sulfur polymer produced by the reaction of sulfur vapor with an organic material will bind any metals contained in the organic rendering them insoluble.

Weinwurm, et al. in European Patent Application EP 313,016 (Chem. Abstr. 111, 80889, 1989) describe a method for insolubilizing heavy metals in waste sludge by mixing with a plastic material, e.g. a clay or shale, capable of immobilizing leachable metals, and heat treating to form a stable silicate complex. This procedure involved pyrolysis and calcination in excess of 1000° C.

Ader et al. in U.S. Pat. No. 4,884,815 teach that certain mercury-containing sludges can be rendered non-leachable or stabilized by treatment with sulfur and cement kiln dust. The sludge is preferably treated with caustic prior to adding the cement kiln dust. The waste sludges contain 20–35% water, and the patent teaches that sulfur reacts with the caustic to produce $S_x^{-2}$ which, in turn, reacts with mercury salts to form mercury sulfide. There is no suggestion that sulfur alone would render metals and ions in soils or sands non-leachable.

Schwab, et al. in U.S. Pat. No. 2,203,881 teach an apparatus for injecting molten sulfur into voids in soil thereby stabilizing the soil. This reference does not suggest that the sulfur mixes with the soil or that leaching of metals or metal ions from soils treated by this process would be prevented.

SUMMARY OF THE INVENTION

The object of this invention is to provide a process for stabilization of substantially inorganic substrates and a useful product produced by this process. This process combines simplicity and reliability coupled with an inexpensive operation and economies resulting from sale of the useful product of the process. The process of this invention involves treating an inorganic substrate or substantially inorganic substrate with elemental sulfur at a temperature above the melting point of sulfur thus converting the substrate into a solid, inert material. The leaching of metals, metal ions and other inorganic ions originally contained in the substrate is thereby prevented. Additives such as caustic and cement kiln dust are not required in this process. Furthermore, the present process may be conducted under substantially anhydrous conditions.

DETAILED DESCRIPTION OF THE INVENTION

"Soil" is herein defined as the superficial, unconsolidated part of the mantle of the earth. Soil used for leaching experiments is USEPA Synthetic Soil Matrix (SSM) available from USEPA Releases Control Branch, Risk Reduction Engineering laboratory, Edison, N.J. 08837.

"Inorganic substrate" is herein defined as a relatively free flowing material of intermediate to small particle size composed of chemical compounds which do not contain appreciable amounts of carbon to carbon bonds and containing at least 10% silicon oxides or silicic acids or salts thereof. Inorganic substrates include, but are not limited to soils, sands, fly ashes, dredging from waterways, sludges, slags, foundry wastes, mine wastes, chemical wastes, refining wastes, and the like. "Substantially inorganic substrate" is defined as an inorganic substrate containing less than 10% organic compounds and at least 10% silicon oxides or silicic acids or salts thereof.

"Metals" are herein defined as elements yielding positively charged ions in aqueous solution of their salts. Metals contemplated by this invention include, but are not limited to Be, Sc, V, Cr, Mn, Co, Ni, Ga, Ge, As, Se, Rb, St, Y, Zr, Nb, Mo, Tc, Ru, Rh, Cd, In, Sn, Sb, Te, Cs, Ba, La, Os, Ir, Hg, Pb, Bi, Po, Ra, U, Pu, and the like. Metals of special interest are those which are known to cause toxic effects when released into the environment; these include As, Cr, Pb, Hg, Cd, Se, Pu, and the like.

"Inorganic ions" other than metal ions include CN, SCN, NCS, $PO_4$, $NO_3$, halides, borates, metal oxide ions, and the like.

"Stabilize" means to convert to a solid, hard, non-flowable mass or a solid, inert particulate material which resists common solvents and retains the materials contained therein when subjected to leaching conditions.

"Non leachability" as used herein is as defined by the United States Environmental Protection Agency (USEPA) in the Federal Register, 55, 26986–26998 (1990) which is incorporated herein by reference.

"Treating with sulfur" as used herein means mixing a substrate with sulfur at ambient or elevated temperature and holding the mixture at a temperature above the melting point of sulfur until stabilization is achieved.

This invention comprises a method of stabilizing a substantially inorganic substrate comprising treating said inorganic substrate with elemental sulfur in liquid or vapor phase at a temperature above the melting point of sulfur; with the proviso that cement kiln dust is not added to said inorganic substrate.

In another aspect, this invention comprises a method of stabilizing metals, metal ions and other inorganic ions, such as cyanide in soil comprising treating said soil with sulfur in liquid or vapor phase at a temperature above the melting point of sulfur.

In another aspect, this invention involves treating a substantially inorganic substrate which is a hazardous waste containing metals, metal ions and other inorganic ions with sulfur in liquid or vapor phase at a temperature above the melting point of sulfur thereby converting said hazardous waste to a relatively inert material which is no longer hazardous as defined by the USEPA in the Federal Register, 55., 11798 (1990) which is incorporated herein by reference.

In yet another aspect, this invention involves treating an inorganic substrate which is mixed with organic chemicals and contains metals, metal ions and other inorganic ions with sulfur in liquid or vapor phase at a temperature above the melting point of sulfur thereby rendering the metals, metal ions and other inorganic ions non-leachable as defined by the USEPA and simultaneously converting said organic chemicals to an inert carbon-sulfur polymer. The above method is especially useful for treating soil, sand, dredging from waterways and fly ash from waste-to-energy plants which contain metals, metal ions, other inorganic ions and toxic or hazardous organic chemicals such as polychlorinated biphenyls (PCB) or polychlorinated dibenzodioxine (PCDD). Substantially inorganic substrates are rendered non-leachable and non-hazardous by treatment with sulfur; and any organic chemical contained therein is simultaneously converted to a carbon-sulfur polymer. See U.S. Pat. No. 4,921,936, the text of which is hereby incorporated by reference. The amount of organic chemicals admixed in the inorganic substrate is not critical and may vary from low parts per million to 50% or more. A worker of ordinary skill will recognize that greater amounts of sulfur will be required as the organic content increases. Sulfur may be combined with the inorganic substrate containing organics at ambient or elevated temperatures. The resulting mixture is held at a temperature above the melting point of sulfur, preferably 300° to 350° C. for a time sufficient to complete the reaction, usually one hour or less. This process may be batch or continuous. Excess sulfur may be removed from the stabilized product by solvent extraction or volatilization.

In yet another aspect, this invention involves treating soil which contains metals, metal ions or other inorganic ions with sulfur in liquid or vapor phase at a temperature above the melting point of sulfur thereby rendering the metals, metal ions and other inorganic ions nonleachable as defined by the USEPA.

In yet another aspect, this invention comprises the solid, inert product resulting from the treatment of a substantially inorganic substrate with sulfur in liquid or vapor phase at a temperature above the melting point of sulfur.

The process of this invention is easily carried out. An inorganic or substantially inorganic substrate in a relatively finely divided form is mixed with elemental sulfur at ambient temperature. Particle size of the substrate and sulfur is not critical and may vary from submicron to five or ten mm; however, it is preferred that at least 10 to 20% of the substrate be composed of particles smaller than 2 mm.

The amount of sulfur is not critical, but there must be sufficient sulfur to stabilize and render non-leachable any metals, metal ions, or other inorganic ions contained in the substrate. The ratio of sulfur to substrate is preferably in the range of 1/10 to 1/1 with a more preferred ratio being 1/3. This process will prevent the leaching of individual metals, metal ions and other inorganic ions alone or in combination. The amount of metals, metal ions and other inorganic ions is not critical and may range from the detectable limit to several percent in total.

The resulting mixture of sulfur and inorganic substrate or substantially inorganic substrate is heated at a temperature above the melting point of sulfur, maintaining the sulfur in liquid or vapor phase for a period of time sufficient to effect the stabilization of the substrate. Stirring or shaking of the reactants may be used, but is not critical. Operable temperatures range from 115°–1500° C.; the preferred reaction conditions are with liquid sulfur at temperatures of about 350° C. Under these conditions, the reaction is complete in one hour or less. The worker of ordinary skill will be able to determine the optimum amount of sulfur and the temperature and time of his reaction with minimal experimentation.

Alternatively, the inorganic or substantially inorganic substrate may be combined and reacted with sulfur liquid or sulfur vapor at a temperature above the melting point of sulfur. This invention also contemplates that the reaction may take place with sulfur in liquid or vapor phase in a continuous or batch process. If sulfur vapor is used, it may be desirable to use an inert carrier gas such as nitrogen, carbon dioxide or superheated steam. Alternatively, the reaction may be run at a temperature above the boiling point of sulfur while containing the sulfur vapor within a pressure vessel.

Excess sulfur may be removed from the product by extraction with a solvent such as carbon disulfide or by heating at an elevated temperature in a vacuum or in an inert gas stream to drive off any excess sulfur as a vapor.

In typical runs with soil and sand as substrates, the products contained 1.2–3% sulfur which could not be removed by extraction or vaporization. The exact molecular formulae of these products is not known at the present time, nor is the mechanism of reaction known to be chemical or physical. When ground to powders, these products are dark in color and have the appearance of "black sand".

The product produced by the process of this invention is a hard, chemically inert and biologically inert material which may be used as a building or industrial aggregate or a catalyst support, or as fillers in coatings, cement and asphalt. A variant of this process may be employed to mold the product into specific shapes using suitable transfer molding equipment. A quantity of inorganic substrate and powdered sulfur is mixed together and inserted into the cavity of the mold under pressures which compact the mixture which is held at a temperature above the melting point of sulfur until reaction is complete.

Another application for the product of this invention is to fill holes and cracks in roadways and concrete or masonry structures. As described above, a quantity of inorganic substrate mixed with sulfur is introduced into the cavity and heat is applied until the reaction is completed, thus effecting repair of the structure or roadway.

The following examples are provided solely for the purposes of illustration and do not limit the scope of the invention which is defined by the claims.

EXAMPLE 1

Composition and Properties of SSM Soil

The following components are incorporated in SSM soil:

| Soil Component | Volume % | Weight % |
| --- | --- | --- |
| Sand | 20.0 | 31.4 |
| Gravel (no. 9) | 5.0 | 5.7 |
| Silt | 25.0 | 28.3 |
| Top soil | 20.0 | 19.8 |
| Montmorillonite clay | 7.5 | 5.4 |
| Kaolinite clay | 22.5 | 9.4 |

This soil was found to have a cation exchange capacity of 30.0–34.5; a total organic content of 2.7–3.4 mg/kg; and a pH of 8.0–8.2.

EXAMPLE 2

Stabilization of SSM Soil

A spiked soil sample containing 1000 mg/kg each of $As^{+3}$ (as $As_2O_3$), $Cr^{+6}$ (as $K_2CrO_4$), $Pb^{+2}$ (as $PbSO_4$), and complex cyanide as ferric ferrocyanide was prepared using the SSM soil from Example 1. Fifty grams of the above spiked soil was combined with 50 g sulfur and the resulting mixture was heated at 350° C. in a shaken autoclave. The product, which was very hard, was chiseled from the autoclave and extracted with carbon disulfide. The product was leached with acid; the acid leachate was surveyed with indicator papers and showed no lead or chromate in the leachate. Approximately 3% sulfur remained in the product after extraction with carbon disulfide.

EXAMPLE 3

Stabilization of SSM Soil with 33% Sulfur

Following the procedure of Example 2, 120 g of spiked soil was reacted with 40 g sulfur. The sample was crushed and extracted with carbon disulfide; approximately 3% sulfur remained in the product.

EXAMPLE 4

Stabilization of SSM Soil with Removal of Excess Sulfur

Following the procedure of Example 2, 120 g of SSM soil was reacted with 40 g sulfur. This sample was crushed, extracted with carbon disulfide and annealed at 500° C. for one hour in a tube swept with a nitrogen stream to remove free sulfur. The annealed product was found to contain 1.2% sulfur.

EXAMPLE 5

Stabilization of Sand

Example 4 was repeated using sand in place of soil. The product was extremely hard and required a power drill to remove it from the reactor. Analysis showed that the product contained 1.45% sulfur after annealing.

EXAMPLE 6

Analysis of Product for Extractable Metals

The product of Example 3 was analyzed for extractable metal ions and cyanide by the Wadsworth/Alert Laboratories, 450 William Pitt Way, Pittsburgh, Pa. 15238. The following methods were employed:

For arsenic, chromium and lead, SW846 1311 6010; for cyanide, SW846 9012 (SW846-Test Methods for Evaluating Solid Wastes, Physical/Chemical Methods, Third Edition, EPA, September, 1986, incorporated herein by reference).

Analysis was performed in accordance with USEPA Toxicity Characteristic Leaching Procedure Method 13311 (55 FR 26986).

Under this procedure, the leachate had no detectable arsenic, chromium, lead or cyanide at detection limits of 0.10, 0.01, 0.05 and 2.5 mg/Kg respectively.

Although the invention has been described with regard to its preferred embodiments, which constitute the best mode presently known to the inventor, it should be understood that various changes and modifications as would be obvious to one having ordinary skill in this art may be made without departing from the scope of the invention which is defined by the claims.

I claim:

1. A method of preventing the leaching of metals, metal ions and other inorganic ions from a substantially inorganic substrate containing metals, metal ions or other inorganic ions comprising mixing said substantially inorganic substrate with sulfur vapor and heating the mixture at a temperature greater than the boiling point of sulfur for a sufficient time to prevent leaching of metals, metal ions or other inorganic ions from said substrate, with the proviso that cement kiln dust is not added to said substantially inorganic substrate.

2. The method of claim 1 wherein said substantially inorganic substrate is soil.

3. The method of claim 1 wherein said substantially inorganic substrate is sand.

4. The method of claim 1 wherein said temperature is approximately 300° to 350° C.

5. The method of claim 1 wherein said metal ions are arsenic, chromium, and lead; and said other inorganic ion is cyanide.

6. A method of preventing the leaching of metals, metal ions or other inorganic ions from soil or sand containing metals, metal ions or other inorganic ions comprising mixing said soil or sand with sulfur vapor and heating said mixture at a temperature greater than the boiling point of sulfur for a sufficient time to prevent leaching of metals, metal ions or other inorganic ions from said soil or sand.

7. The method of claim 6 wherein said temperature is approximately 300° to 350° C.

* * * * *